124,615

UNITED STATES PATENT OFFICE.

RICHARD PARKE, OF NEW YORK, N. Y., ASSIGNOR TO HIMSELF AND HANNAH B. MOUNTAIN, OF SAME PLACE.

IMPROVEMENT IN IMITATION-GOLD VARNISHES.

Specification forming part of Letters Patent No. 124,615, dated March 12, 1872.

*To all whom it may concern:*

Be it known that I, RICHARD PARKE, of the city, county, and State of New York, have invented a new and useful Improvement in Gilt Varnishes, of which the following is a specification:

My invention consists of a composition producing a perfect imitation of gold-varnish, for use on tin-ware, zinc, other metals, and wood, and a much cheaper article than the usual gold varnish.

The principal ingredients of my composition are asphaltum, yellow aniline, umber, and gamboge, which are combined and held in solution by turpentine and varnish.

The process of preparing my gilt varnish is as follows: One-half gallon of turpentine, one-half gill of asphaltum, two ounces of yellow aniline, one-quarter of a pound of umber, one gallon of turpentine varnish, and one-quarter of a pound of gamboge are mixed and boiled together for ten hours, and afterward strained and allowed to cool, when it is ready for use.

The articles of tin, wood, or metal, to which the varnish is to be applied, after having received a coating of this varnish by means of a brush or other suitable means, are placed in an oven heated to about ninety degrees to two hundred and thirty, and are baked for from five to six hours. After coming from the oven they are rubbed down with pumice-stone to remove all unevenness, polished with rotten-stone and oil, and finally finished off by hand. This imitation of gold varnish, by my improved composition, is perfect, and cannot easily be distinguished from the real gold varnish.

Having described my invention, I claim—

The imitation-gold varnish composed of the ingredients in the proportions set forth, and applied, under heat, in the manner herein described.

RICHARD PARKE.

Witnesses:
   W. C. CARPENTER,
   W. E. CARPENTER.